(12) United States Patent
Miura

(10) Patent No.: US 10,641,395 B2
(45) Date of Patent: May 5, 2020

(54) SEALING APPARATUS

(71) Applicant: NOK CORPORATION, Tokyo (JP)

(72) Inventor: Daisuke Miura, Fukushima (JP)

(73) Assignee: NOK CORPORATION, Tokyo (JP)

( * ) Notice: Subject to any disclaimer, the term of this patent is extended or adjusted under 35 U.S.C. 154(b) by 324 days.

(21) Appl. No.: 15/708,448

(22) Filed: Sep. 19, 2017

(65) Prior Publication Data

US 2018/0003302 A1 Jan. 4, 2018

Related U.S. Application Data

(63) Continuation of application No. PCT/JP2016/056938, filed on Mar. 7, 2016.

(30) Foreign Application Priority Data

Mar. 31, 2015 (JP) ................................. 2015-073072

(51) Int. Cl.
*F16J 15/32* (2016.01)
*F16J 15/3244* (2016.01)
*F16J 15/3232* (2016.01)

(52) U.S. Cl.
CPC ....... *F16J 15/3244* (2013.01); *F16J 15/3232* (2013.01)

(58) Field of Classification Search
CPC .................................................. F16J 15/3244
See application file for complete search history.

(56) References Cited

U.S. PATENT DOCUMENTS 3,501,155 A * 3/1970 Dega .................... F16J 15/3244
    277/309
3,913,925 A * 10/1975 Gyory .................. F16J 15/3244
    277/559

(Continued)

FOREIGN PATENT DOCUMENTS

CN      1147599 A      4/1997
CN      1639489 A      7/2005

(Continued)

OTHER PUBLICATIONS

Extended European Search Report dated Oct. 8, 2018 for corresponding European Application No. 16772095.2.

(Continued)

*Primary Examiner* — Vishal A Patel
(74) *Attorney, Agent, or Firm* — Pearne & Gordon LLP (57) ABSTRACT

In a sealing apparatus, a lip tip portion of a seal lip of an elastic body part is defined by a sealing side surface and an atmospheric side surface, connected through a lip tip with each other. The lip tip portion includes a circumferential projection and a screw portion on the atmospheric side surface. The circumferential projection extends parallel to the lip tip. The screw portion includes a plurality of parallel screw projections and a plurality of bilge screw projections. The parallel screw projections are arranged at equal pitch intervals in parallel with each other between the lip tip and the circumferential projection. The bilge screw projections are arranged at equal pitch intervals in parallel with each other from the circumferential projection toward the atmospheric side. The bilge screw projections do not overlap the adjacent bilge screw projections in a direction of axis with each other.

5 Claims, 9 Drawing Sheets

(56) References Cited

U.S. PATENT DOCUMENTS

| | | | | |
|---|---|---|---|---|
| 4,350,347 | A * | 9/1982 | Heinrich | F16J 15/324 |
| | | | | 277/549 |
| 5,511,886 | A * | 4/1996 | Sink | B61F 15/22 |
| | | | | 277/559 |
| 5,759,466 | A | 6/1998 | Onuma et al. | |
| 5,915,696 | A | 6/1999 | Onuma et al. | |
| 6,036,193 | A | 3/2000 | Onuma et al. | |
| 6,276,691 | B1 * | 8/2001 | Nishigaki | F16J 15/3244 |
| | | | | 264/161 |
| 6,726,211 | B1 * | 4/2004 | Kuroki | F16J 15/3244 |
| | | | | 277/353 |
| 2005/0127613 | A1 | 6/2005 | Furuyama | |
| 2007/0152369 | A1 | 7/2007 | Furuyama | |
| 2010/0109252 | A1 * | 5/2010 | Matsui | F16J 15/324 |
| | | | | 277/559 |
| 2011/0095486 | A1 * | 4/2011 | Nakagawa | F16J 15/324 |
| | | | | 277/549 |
| 2012/0007319 | A1 | 1/2012 | Miura et al. | |
| 2014/0319775 | A1 * | 10/2014 | Kamemura | F16J 15/3244 |
| | | | | 277/400 |
| 2016/0161002 | A1 | 6/2016 | Kamemura et al. | |

FOREIGN PATENT DOCUMENTS

| | | |
|---|---|---|
| CN | 101652588 A | 2/2010 |
| CN | 101809343 A | 8/2010 |
| EP | 1 479 949 A1 | 11/2004 |
| EP | 2 843 269 A1 | 3/2015 |
| EP | 2 998 620 A1 | 3/2016 |
| JP | 07-208611 A | 8/1995 |
| JP | 2000-179700 A | 6/2000 |
| JP | 2002-206645 A | 7/2002 |
| JP | 2009-068720 A | 4/2009 |
| JP | 2013-061022 A | 4/2013 |
| JP | 5637172 B2 | 10/2014 |
| JP | 2014-222092 A | 11/2014 |
| JP | 3278349 B2 | 2/2015 |
| WO | 2013/161120 A1 | 10/2013 |

OTHER PUBLICATIONS

Notification for Granting an Invention Patent dated Jul. 20, 2018 for corresponding Chinese Application No. 201680020231.6 and English translation.

Chinese Office Action dated Mar. 19, 2018 in a corresponding Chinese Application No. 201680020231.6 and English translation.

International Search Report and Written Opinion from Corresponding Application No. PCT/JP2016/056938 dated May 10, 2016.

Decision to Grant a Patent dated Aug. 18, 2017 for corresponding JP Application No. 2016-537033 and English translation.

English translation of Written Opinion for corresponding International Application No. PCT/JP2016/056938 dated May 10, 2016.

International Preliminary Report on Patentability for corresponding International Application No. PCT/JP2016/056938 dated Oct. 3, 2017.

Office Action dated Oct. 1, 2019 for corresponding European Application No. 16772095.2.

* cited by examiner

SEALING APPARATUS

CROSS REFERENCE TO RELATED APPLICATIONS

The present application is a continuation application of International Application No. PCT/JP2016/056938, filed on Mar. 7, 2016, which claims priority to Japanese Patent Application No. 2015-073072, filed on Mar. 31, 2015. The contents of these applications are incorporated herein by reference in their entirety.

BACKGROUND

Technical Field

The present disclosure relates to a sealing apparatus, and particularly relates to a sealing apparatus for use in a rotating shaft of an automobile, a general-purpose machine or the like.

Background Art

Figure 8:
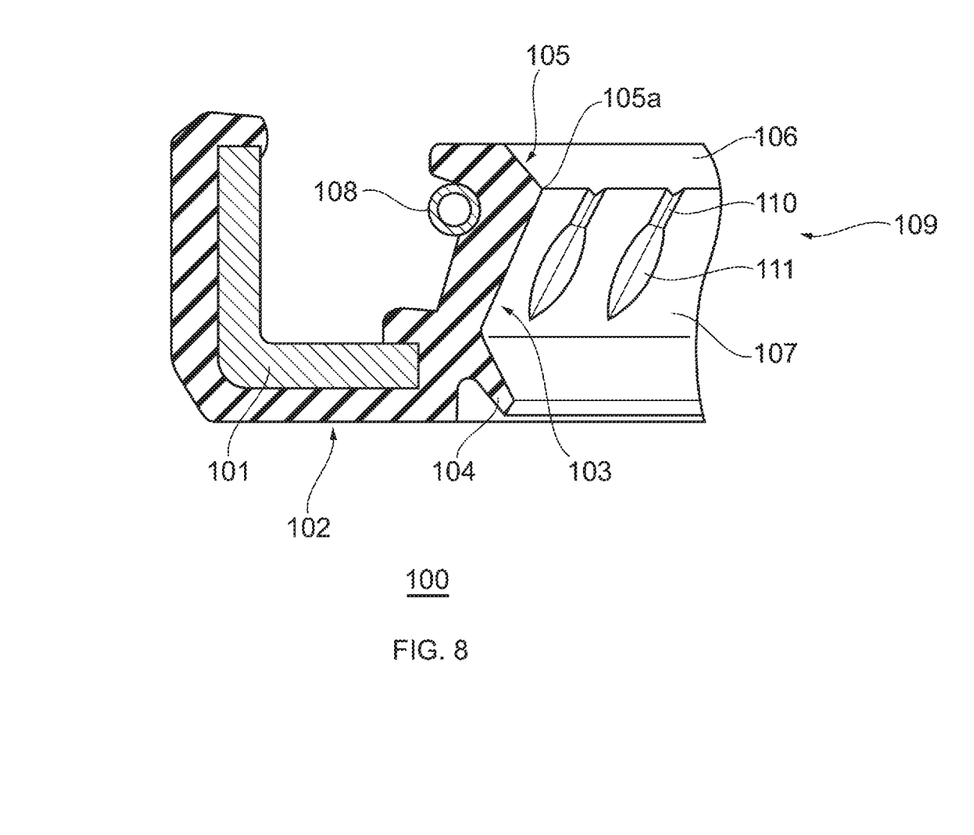
FIG. 8 is a sectional diagram taken along an axis for illustrating a schematic configuration of an example of a conventional sealing apparatus.

Conventionally, a sealing apparatus has been used, for example, to seal between a rotating shaft and a through hole of a housing into which the rotating shaft is inserted, in an engine of a vehicle or the like. FIG. 8 is a cross-sectional view taken along an axis for illustrating a schematic configuration of an example of a conventional sealing apparatus. As illustrated in FIG. 8, in a conventional sealing apparatus 100, an elastic body part 102 made of an elastic body is formed integrally with a metal reinforcing ring 101. In the elastic body part 102, a seal lip 103 and a dust lip 104 are formed. In the seal lip 103, on a side of a sealed object such as oil, a lip tip portion 105, having a wedge-shaped cross section and projecting toward an inner periphery, is formed. The lip tip portion 105 is defined by a sealing side surface 106 having a conical surface on the sealed object side and an atmospheric side surface 107 having a conical surface on a non-sealed object side (atmospheric side). In addition, in the seal lip 103, a garter spring 108 is attached to a surface on an outer periphery side facing the lip tip portion 105. The garter spring 108 urges the lip tip portion 105 against the inner periphery side to apply a tension force on the rotating shaft to the lip tip portion 105.

The conventional sealing apparatus includes a sealing apparatus having a plurality of screw projections arranged at equal intervals to form an airflow from the atmospheric side to the sealed object side and exert a pumping action of pushing back a sealed object such as oil to the sealed object side, the sealed object flowing beyond the lip tip portion and leaking into the atmospheric side. For example, the sealing apparatus 100 includes screw projections 109 exerting the pumping action on the atmospheric side surface 107. The screw projections 109 include parallel screw projections 110 extending from a lip tip 105a of the lip tip portion 105; and bilge screw projections 111 connecting to the parallel screw projections 110 on the atmospheric side. The parallel screw projections 110 extend obliquely with respect to the lip tip 105a, and the shape of the cross section orthogonal to an extending direction thereof is uniform over the extending direction. The bilge screw projections 111 extend in the same direction as the parallel screw projections 110 and have a form of a bilge such that an intermediate portion in the extending direction has maximum height and width (For example, see Japanese Patent 3278349). The thus configured screw projections 109 including the parallel screw projections 110 and the bilge screw projections 111 allow the screw projections 109 to maintain the pumping action even if wear of the lip tip portion 105 progresses.

In the above described conventional sealing apparatus 100, a gap between the dust lip 104 and the rotating shaft may be produced by wear or the like of the dust lip 104, and foreign matter such as muddy water, sand, or dust may enter between the lip tip portion 105 and the rotating shaft from the atmospheric side through the gap. In this case, the foreign matter is carried toward the lip tip 105a side and the foreign matter may be caught between the lip tip 105a and the rotating shaft, thereby producing a gap between the lip tip 105a and the rotating shaft, causing the sealed object to leak into the atmospheric side, and leading to the need to replace or clean the sealing apparatus 100.

Figure 9:
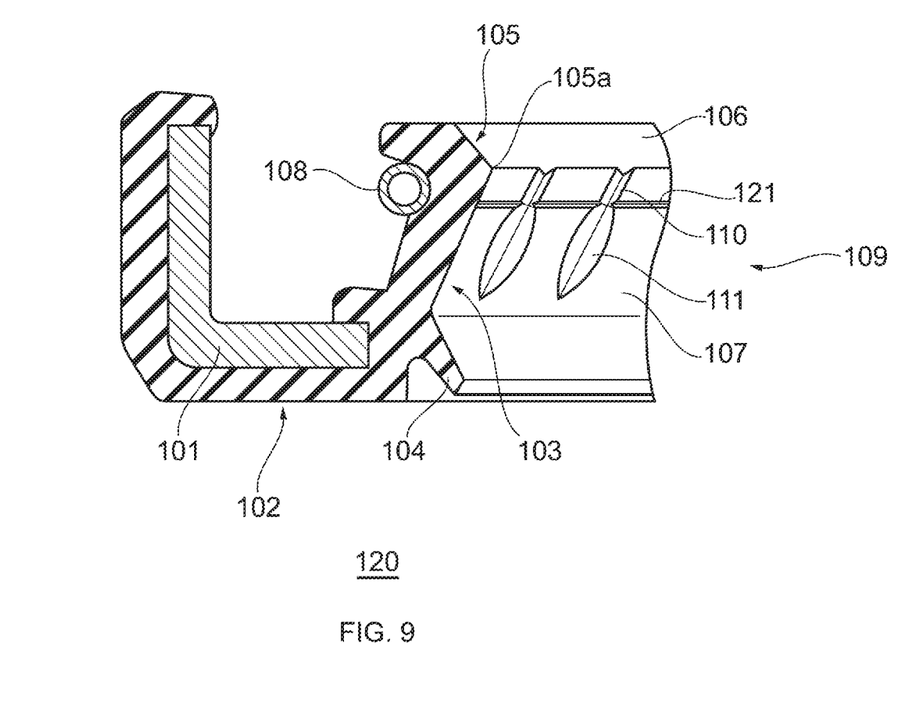
FIG. 9 is a sectional diagram taken along the axis for illustrating a schematic configuration of another example of the conventional sealing apparatus.

Thus, as illustrated in FIG. 9, the conventional sealing apparatus includes another sealing apparatus provided with a circumferential projection 121 extending parallel to the lip tip 105a on the atmospheric side surface 107 of the lip tip portion 105. For example, like a sealing apparatus 120, the circumferential projection 121 crosses the screw projections 109 at a connection portion between the parallel screw projections 110 and the bilge screw projections 111, and projects from the atmospheric side surface 107 between the adjacent screw projections 109. Even if foreign matter enters between the lip tip portion 105 and the rotating shaft from the atmospheric side due to wear or the like of the dust lip 104, in the sealing apparatus 120, the circumferential projection 121 can suppress the foreign matter from reaching the lip tip 105a. (For example, see Japanese Patent 5637172).

In the sealing apparatus 120 having the circumferential projection 121, the circumferential projection 121 can suppress the entered foreign matter from further advancing toward the lip tip 105a, but may allow the foreign matter to remain and deposit between the screw projections 109 and the circumferential projection 121. If foreign matter deposits between the screw projections 109 and the circumferential projection 121, the deposited foreign matter interferes with the rotating shaft to cause the lip tip portion 105 to float up from the rotating shaft, producing a gap between the lip tip 105a and the rotating shaft, causing the sealed object to leak, and leading to the need for maintenance such as replacing or cleaning the sealing apparatus 120.

Thus, for further reduction in the frequency of replacement or maintenance of the sealing apparatus 120, to the conventional sealing apparatus 120, it has been required to further suppress the foreign matter from depositing between the screw projections 109 on further the non-sealed object side than the circumferential projection 121.

The present disclosure is related to providing a sealing apparatus capable of suppressing foreign matter from depositing between screw projections on a non-sealed object side than a circumferential projection.

SUMMARY

According to the present disclosure, a sealing apparatus comprises: an annular reinforcing ring centered about an axis; and an annular elastic body part including a seal lip, attached to the reinforcing ring, made of an elastic body, and centered about the axis. The seal lip comprises a lip tip portion projecting toward an inner periphery side and defined by an annular sealing side surface on a sealed object side and an annular atmospheric side surface on a non-sealed object side. The sealing side surface and the atmospheric side surface are connected through a lip tip, the lip tip portion comprises a circumferential projection and a screw portion capable of forming an airflow flowing toward the sealed object side, on the atmospheric side surface. The screw portion comprises a plurality of sealed object side screw projections obliquely extending with respect to the lip tip and projecting from the atmospheric side surface; and a plurality of non-sealed object side screw projections obliquely extending with respect to the lip tip and projecting from the atmospheric side surface. The circumferential projection annularly projects from the atmospheric side surface, extends parallel to the lip tip, and the circumferential projection has a height from the atmospheric side surface less than the height of each of the sealed object side screw projections and the non-sealed object side screw projections from the atmospheric side surface. The sealed object side screw projections extend between the lip tip and the circumferential projection and are arranged at equal pitch intervals in parallel with each other. The non-sealed object side screw projections extend from the circumferential projection to the non-sealed object side and are arranged at equal pitch intervals in parallel with each other, and each of the non-sealed object side screw projections does not overlap the adjacent non-sealed object side screw projections in a direction of the axis with each other.

In the sealing apparatus according to an aspect of the present disclosure, the non-sealed object side screw projections have a pitch greater than the pitch of the sealed object side screw projections.

In the sealing apparatus according to an aspect of the present disclosure, each of the non-sealed object side screw projections is connected to each of at least some of the sealed object side screw projections at an end portion on the sealed object side of the non-sealed object side screw projections.

In the sealing apparatus according to an aspect of the present disclosure, the sealed object side screw projections and the non-sealed object side screw projections extend in parallel with each other.

In the sealing apparatus according to an aspect of the present disclosure, the sealed object side screw projections are parallel screw projections having a uniform shape of a cross section orthogonal to an extending direction of the sealed object side screw projections, and the non-sealed object side screw projections are bilge screw projections having a boat bottom shape and a height from the atmospheric side surface gradually changing along an extending direction of the non-sealed object side screw projections.

In the sealing apparatus according to an aspect of the present disclosure, the height of the bilge screw projections from the atmospheric side surface gradually increases toward the non-sealed object side and then gradually decreases and is equal to or greater than the height of the parallel screw projections at an end portion on the sealed object side.

Effects of Disclosure

According to a sealing apparatus of the present disclosure, the circumferential projection can suppress foreign matter from depositing between the screw projections on the non-sealed object side.

BRIEF DESCRIPTION OF DRAWINGS

FIGS. 3A to 3C are diagrams for illustrating shapes of a parallel screw projection and a bilge screw projection connected to each other in the sealing apparatus illustrated in FIG. 1.

FIGS. 4A and 4B are diagrams for illustrating a shape of the parallel screw projection in the sealing apparatus illustrated in FIG. 1.

DESCRIPTION OF EMBODIMENTS

Hereinafter, embodiments of the present disclosure will be described with reference to the accompanying drawings.

Figure 1:
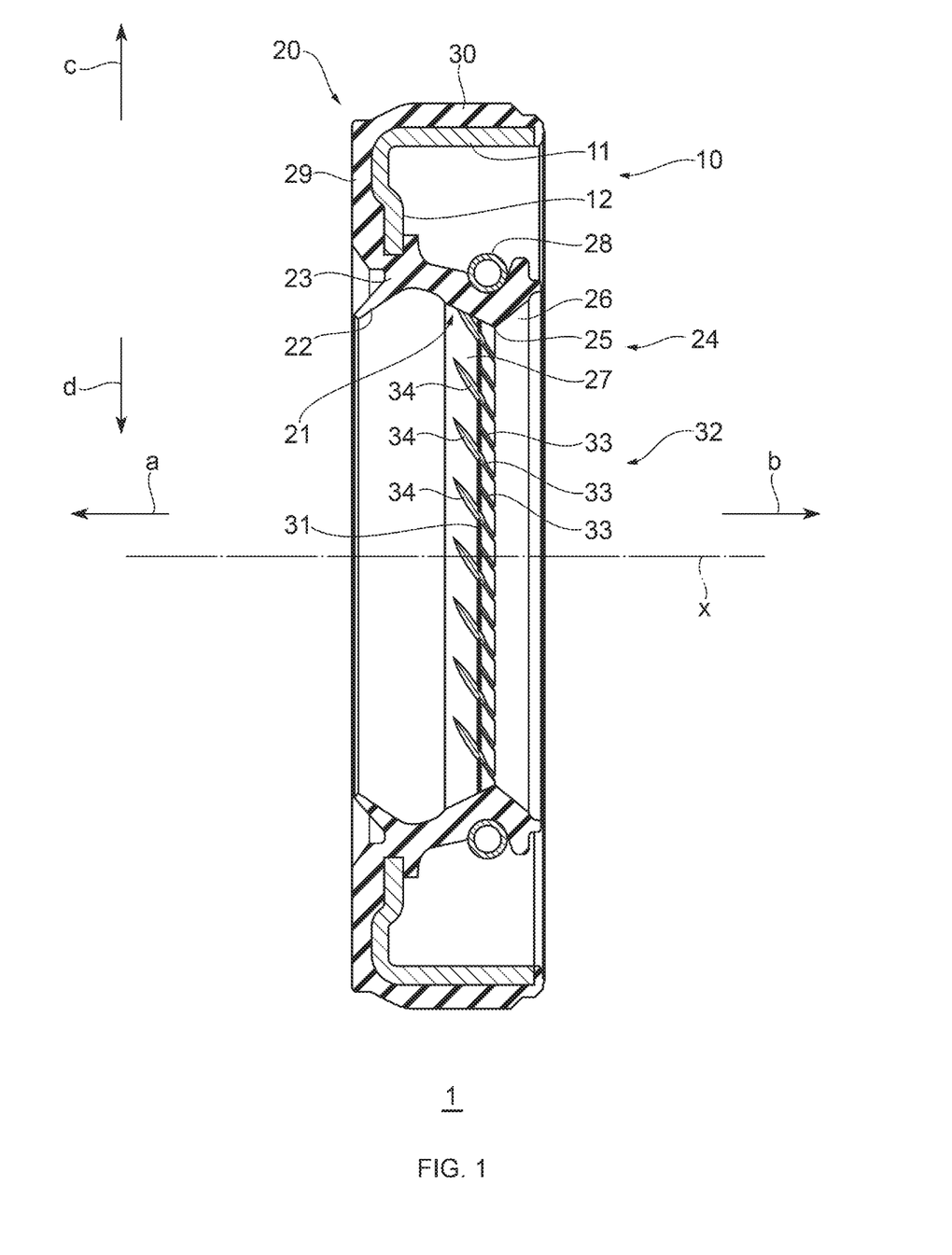
FIG. 1 is a sectional diagram taken along an axis for illustrating a schematic configuration of a sealing apparatus according to an embodiment of the present disclosure.

FIG. 1 is a partial sectional diagram taken along axis x for illustrating a schematic configuration of a sealing apparatus 1 according to an embodiment of the present disclosure. The sealing apparatus 1 according to the embodiment of the present disclosure is used to seal between a rotating shaft and a member having a through hole through which the rotating shaft is inserted in an automobile, a general-purpose machine, or the like. For example, the sealing apparatus 1 is applied to seal between a crankshaft and a front cover in an engine of an automobile. For convenience of description, in the following description, an arrow a (see FIG. 1) direction in a direction of an axis x will be referred to as an outer side, and an arrow b (see FIG. 1) direction in the direction of the axis x will be referred to as an inner side. More specifically, the outer side is a non-sealed object side, namely, an atmospheric side in which a sealed object is kept from not existing, and the inner side is a sealed object side, namely, a side facing an object to be sealed such as oil. In a direction perpendicular to the axis x (which will be also referred to as "a radial direction"), the direction away from the axis x (indicated by an arrow c in FIG. 1) will be referred to as an outer periphery side, and the direction toward the axis x (indicated by an arrow "d" in FIG. 1) will be referred to as an inner periphery side.

As illustrated in FIG. 1, the sealing apparatus 1 includes a reinforcing ring 10 that is made of a metal and has an annular shape centered about the axis x, and an elastic body part 20 that is made of an elastic material and has an annular shape centered about the axis x. The elastic body part 20 is integrally attached to the reinforcing ring 10. The metal material of the reinforcing ring 10 may be stainless steel or SPCC (cold rolled steel sheet), for example. The elastic material forming the elastic body part 20 may be various rubber materials, for example. The various rubber materials include synthetic rubbers, such as nitrile rubber (NBR), hydrogenated nitrile rubber (H-NBR), acrylic rubber (ACM), fluororubber (FKM).

The reinforcing ring 10 is manufactured by, for example, press working or forging, and the elastic body part 20 is molded with a mold by cross-linking (vulcanization). During the cross-linking, the reinforcing ring 10 is placed inside the mold, and then the elastic body part 20 is bonded to the reinforcing ring 10 by cross-linking(vulcanization) bonding, and then the elastic body part 20 is integrally molded with the reinforcing ring 10.

As illustrated in FIG. 1, for example, the reinforcing ring 10 has a substantially L-shaped cross section and includes a cylindrical portion 11 forming a cylindrical portion extending in the direction of the axis x, and a flange portion 12 forming a hollow disk-shaped portion extending from an end portion on the outer side of the cylindrical portion 11 toward the inner periphery side.

The elastic body part 20 is attached to the reinforcing ring 10. According to the present embodiment, the elastic body part 20 is formed integrally with the reinforcing ring 10 in a manner such that the elastic body part 20 covers the reinforcing ring 10 from the outer side and the outer periphery side. The elastic body part 20 includes a seal lip 21, a dust lip 22, and a lip waist portion 23. As illustrated in FIG. 1, the lip waist portion 23 is a portion located near the end portion on the inner periphery side in the flange portion 12 of the reinforcing ring 10 in the elastic body part 20. The seal lip 21 is a portion extending inwardly from the lip waist portion 23 and is disposed to face the cylindrical portion 11 of the reinforcing ring 10. The dust lip 22 extends outwardly from the lip waist portion 23 toward the axis x.

The seal lip 21 includes, at an inner side end portion thereof, an annular lip tip portion 24 whose shape of the cross section along the axis x (hereinafter may also be referred to as a cross-sectional shape) is a wedge shape projecting toward the inner periphery side. The lip tip portion 24 is defined by an annular sealing side surface 26 on the sealed object side (inner side) and an annular atmospheric side surface 27 on the non-sealed object side (outer side or atmospheric side), which are connected via a lip tip 25 with each other. The sealing side surface 26 is a conical surface shaped tapered surface whose diameter increases toward the inner side in the direction of the axis x. The atmospheric side surface 27 is a conical surface shaped tapered surface whose diameter increases toward the outer side in the direction of the axis x. The sealing side surface 26 and the atmospheric side surface 27 intersect with each other on a small diameter side and the lip tip 25 is formed at this intersecting portion. The lip tip 25 forms a circle centered about the axis x in the cross section orthogonal to the axis x and is located at the innermost periphery side in the lip tip portion 24. The lip tip portion 24 is shaped so that a vicinity of the lip tip 25 comes close contact with an outer peripheral surface of an unillustrated rotating shaft in a manner that the outer peripheral surface of the unillustrated rotating shaft is slidable in a usage state, thereby sealing a through hole through which the rotating shaft is inserted.

In addition, a garter spring 28 is fitted on the outer peripheral portion side of the seal lip 21 with facing the lip tip portion 24. The garter spring 28 urges the lip tip portion 24 of the seal lip 21 in the radial direction toward the inner periphery side to apply a predetermined magnitude of tension force to the lip tip portion 24 against the rotating shaft.

The dust lip 22 is a portion extending from the lip waist portion 23 and extends in a direction toward the outer side and the inner periphery side. The dust lip 22 serves to prevent foreign matter such as muddy water, sand, and dust from entering in a direction toward the lip tip portion 24 in a usage state.

In addition, the elastic body part 20 also includes a rear cover 29 and a gasket portion 30. The rear cover 29 covers the flange portion 12 of the reinforcing ring 10 from the outer side. The gasket portion 30 covers the cylindrical portion 11 of the reinforcing ring 10 from the outer periphery side. The radial thickness of the gasket portion 30 is set to generate a fitting force of a predetermined magnitude, which is a force directed toward the outer periphery side in the radial direction, when the sealing apparatus 1 is press-fitted into a through hole of an unillustrated member through which the rotating shaft is inserted, and then, the gasket portion 30 is compressed in the radial direction between the through hole and the cylindrical portion 11 of the reinforcing ring 10.

Figure 2:
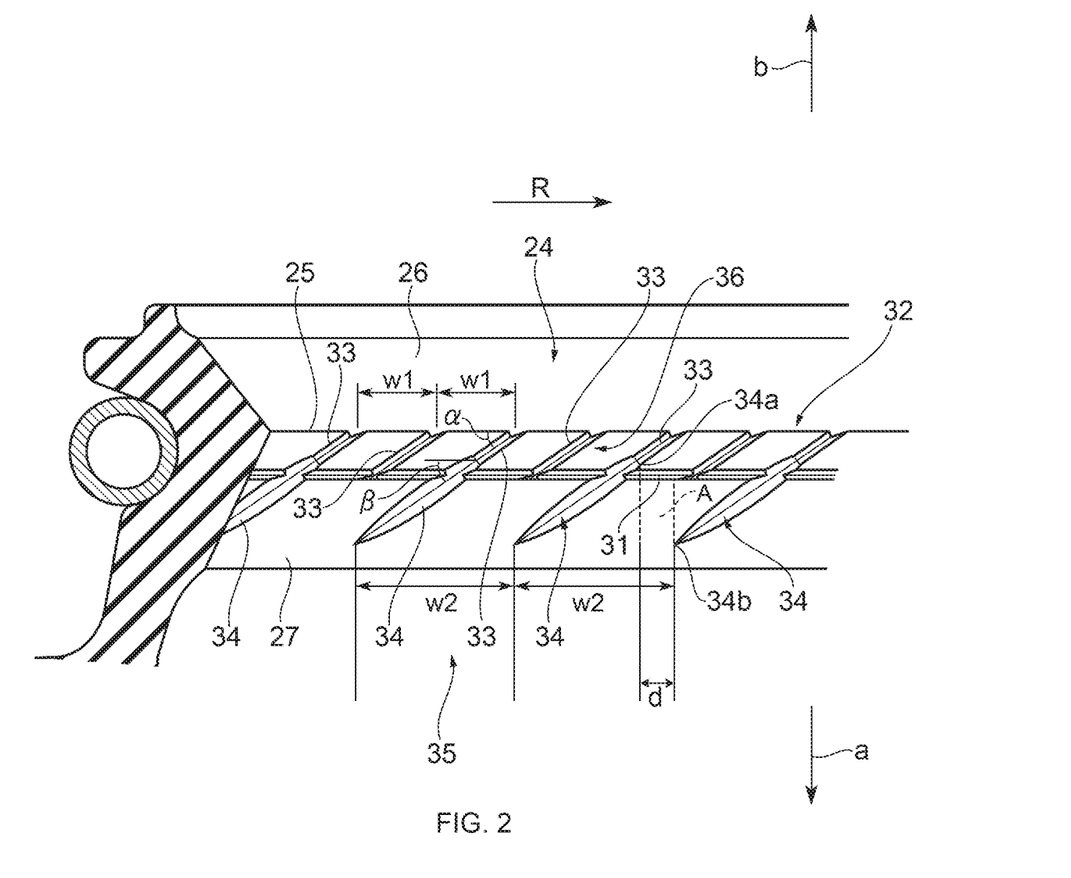
FIG. 2 is a partially enlarged diagram of the sealing apparatus illustrating an enlarged lip tip portion of the sealing apparatus illustrated in FIG. 1.

Further, the lip tip portion 24 of the sealing apparatus 1 includes a circumferential projection 31 serving as a barrier for suppressing foreign matter from entering and a screw portion 32 capable of forming an airflow toward the sealed object side (inner side), on the atmospheric side surface 27. FIG. 2 is a partially enlarged diagram of the sealing apparatus 1 illustrating an enlarged lip tip portion 24 of the sealing apparatus 1.

As illustrated in FIG. 2, the circumferential projection 31 projects from the atmospheric side surface 27 to the inner periphery side and extends annularly around the axis x on the atmospheric side surface 27. In addition, the circumferential projection 31 extends parallel to the lip tip 25. A cross-sectional shape of a cross section orthogonal to an extending direction of the circumferential projection 31 is uniform over the extending direction. Note that the cross-sectional shape is not particularly limited, and may be, for example, rectangular, substantially rectangular, triangular, or substantially triangular.

The screw portion 32 comprises a plurality of sealed object side screw projections obliquely extending with respect to the lip tip 25 and projecting from the atmospheric side surface 27; and a plurality of non-sealed object side screw projections obliquely extending with respect to the lip tip 25 and projecting from the atmospheric side surface 27. The sealed object side screw projections extend between the lip tip 25 and the circumferential projection 31 and are arranged at equal pitch intervals in parallel with each other. In addition, the non-sealed object side screw projections extend on further the atmospheric side than the circumferential projection 31 and are arranged at equal pitch intervals in parallel with each other.

Specifically, as illustrated in FIG. 2, the screw portion 32 includes a plurality of parallel screw projections 33 serving as the sealed object side screw projections and a plurality of bilge screw projections 34 serving as the non-sealed object side screw projections. The parallel screw projections 33 are projections projecting from the atmospheric side surface 27 toward the inner periphery side, and extend spirally obliquely with respect to the lip tip 25 on the atmospheric side surface 27. The bilge screw projections 34 are projections projecting from the atmospheric side surface 27 toward the inner periphery side and extend spirally obliquely with respect to the lip tip 25 on the atmospheric side surface 27. The parallel screw projections 33 extend between the lip tip 25 and the circumferential projection 31 and are arranged in the circumferential direction at equal pitch intervals of pitch w1 in parallel with each other. In addition, the bilge screw projections 34 extend from the circumferential projection 31 toward the atmospheric side and are arranged in the circumferential direction at equal pitch intervals of pitch w2 in parallel with each other. The parallel screw projections 33 and the bilge screw projections 34 are inclined in a direction opposite to a sliding direction (direction of arrow R in FIG. 2) of the rotating shaft with respect to the lip tip 25 on the atmospheric side surface 27, and are configured to have shapes capable of generating an airflow flowing from the atmospheric side (outer side) to the sealed object side (inner side) as the rotation of the rotating shaft. An inclination angle α of the parallel screw projection 33 with respect to the lip tip 25 may be the same as or different from an inclination angle β of the bilge screw projection 34 with respect to the lip tip 25.

Note that each of the non-sealed object side screw projections does not overlap the adjacent non-sealed object side screw projections in the direction of the axis x. Specifically, each of the bilge screw projections 34 serving as the non-sealed object side screw projections does not overlap the adjacent bilge screw projections 34 in the direction of the axis x. In other words, projection drawings (lines) of the mutually adjacent bilge screw projections 34 in the direction of the axis x do not overlap each other. Specifically, as illustrated in FIG. 2, each of the bilge screw projections 34 has a distance d in the extending direction (a sliding direction of the rotating shaft) of the lip tip 25 between an end portion (end portion 34a) on the sealed object side of one bilge screw projection 34 and an end portion (end portion 34b) on the atmospheric side of another bilge screw projection 34 adjacent to the bilge screw projection 34 on the sliding direction (direction of arrow R) of the rotating shaft side.

In the sealing apparatus 1 according to the present embodiment, the inclination angle α of the parallel screw projection 33 with respect to the lip tip 25 is the same as the inclination angle β of the bilge screw projection 34 with respect to the lip tip 25 (α=β). The parallel screw projections 33 and the bilge screw projections 34 extend in parallel with each other. In addition, the pitch w2 of the bilge screw projections 34 is twice the pitch w1 of the parallel screw projections 33 (w2=w1×2). In the screw portion 32, the number of parallel screw projections 33 is twice the number of bilge screw projections 34. For example, the pitch w1 of the parallel screw projections 33 is 0.65 mm to 0.75 mm. In addition, the bilge screw projections 34 at the atmospheric side end portions (end portion 34a) are connected to part of the plural parallel screw projections 33 at the atmospheric side end portion, respectively, and more specifically, connected to every other parallel screw projection 33 in the circumferential direction.

In other words, in the sealing apparatus 1, long screw projections 35 each of which is formed by connecting the parallel screw projections 33 and the bilge screw projections 34 and short screw projections 36 each of which is formed only by the parallel screw projections 33 and is shorter than the long screw projection 35 are arranged alternately at equal intervals w1 in the circumferential direction on the atmospheric side surface 27.

Figure 3A:
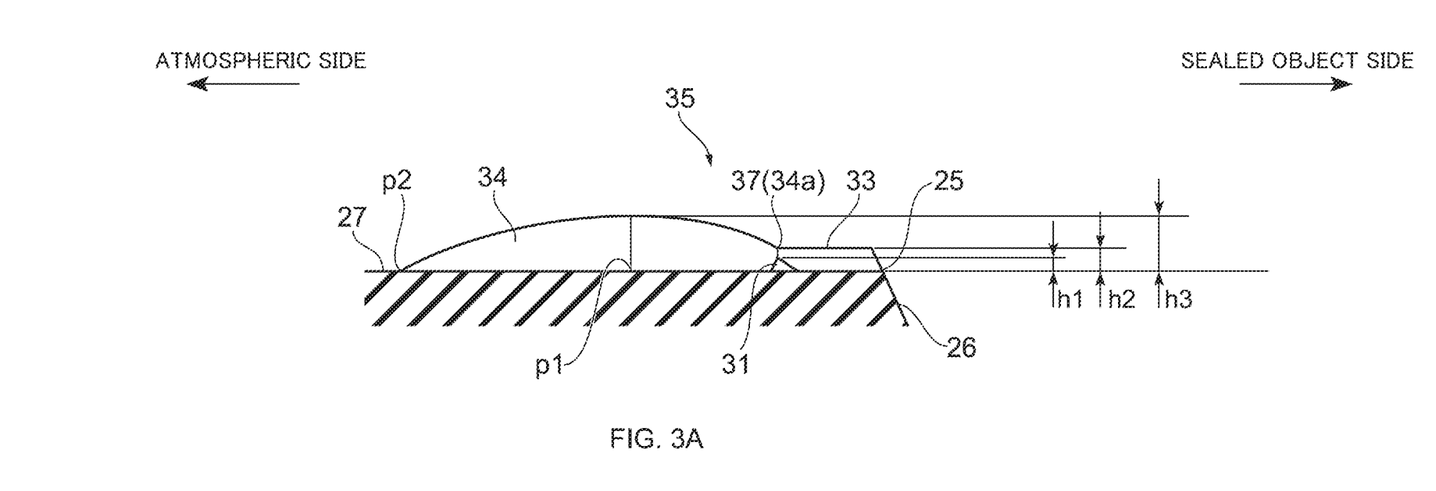
FIG. 3A is an enlarged diagram of an long screw projection viewed in a direction orthogonal to an extending direction along an atmospheric side surface.
Figure 3B:
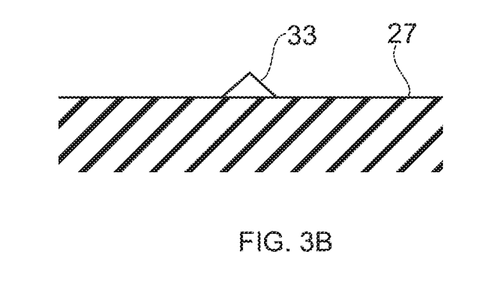
FIG. 3B is a sectional diagram of a cross section orthogonal to the extending direction of the parallel screw projection in the long screw projection.
Figure 3C:
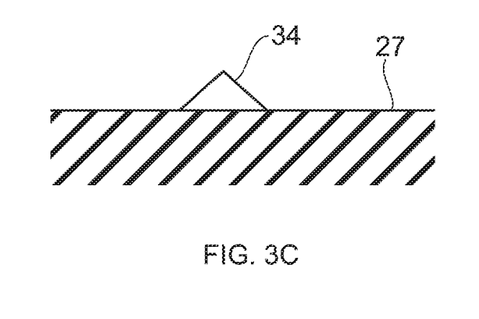
FIG. 3C is a sectional diagram of a cross section orthogonal to the extending direction of the bilge screw projection in the long screw projection.

FIGS. 3A to 3C are diagrams for illustrating shapes of a parallel screw projection 33 and a bilge screw projection 34 connected to each other. FIG. 3A is an enlarged diagram of the long screw projection 35 viewed in a direction orthogonal to an extending direction along the atmospheric side surface 27. FIG. 3B is a sectional diagram of a cross section orthogonal to the extending direction of the parallel screw projection 33 in the long screw projection 35. FIG. 3C is a sectional diagram of a cross section orthogonal to the extending direction of the bilge screw projection 34 in the long screw projection 35.

As illustrated in FIG. 3A, the parallel screw projection 33 extends from the lip tip 25 toward the atmospheric side and the height h2 from the atmospheric side surface 27 is uniform over the extending direction. In addition, in the parallel screw projection 33, a cross-sectional shape of the cross section orthogonal to the extending direction is uniform over the extending direction. The cross-sectional shape is not particularly limited, and may be, for example, rectangular, substantially rectangular, triangular, or substantially triangular. In the present embodiment, as illustrated in FIG. 3B, the cross-sectional shape of the cross section orthogonal to the extending direction of the parallel screw projection 33 is triangular with a tip end on the inner periphery side.

As illustrated in FIG. 3A, the bilge screw projection 34 extends from an end portion on the atmospheric side of the parallel screw projection 33 toward the atmospheric side. The height of the bilge screw projection 34 from the atmospheric side 27 is not uniform but gradually changes over the extending direction. Specifically, the height of the bilge screw projection 34 from the atmospheric side 27 is the same as a height h2 of the parallel screw projection 33 at a connection portion 37 (end portion 34a) at which the bilge screw projection 34 is connected to the parallel screw projection 33, from which the height gradually increases toward the atmospheric side and reaches a maximum height h3 at a predetermined position p1 from the connection portion 37 toward the atmospheric side. Then, as farther away from the position p1 toward the atmosphere side, the height of the bilge screw projection 34 from the atmospheric side surface 27 gradually decreases from the height h3 and reaches zero at a predetermined position p2 from the connection portion 37 toward the atmospheric side. In addition, the cross-sectional shape of the bilge screw projection 34 in the cross section orthogonal to the extending direction is similar over the extending direction. The area of the cross-sectional shape gradually increases as far away from the connection portion 37 toward the atmospheric side, reaches a maximum at the position p1, and then gradually decreases as farther away from the position p1 toward the atmospheric side. The cross-sectional shape of the cross section orthogonal to the extending direction of the bilge screw projection 34 is not particularly limited, and may be, for example, rectangular, substantially rectangular, triangular, or substantially triangular. In the present embodiment, as illustrated in FIG. 3C, the cross-sectional shape of the cross section orthogonal to the extending direction of the bilge screw projection 34 is triangular with a tip end on the inner periphery side. As described above, the bilge screw projection 34 is a projection having a bilge shape.

Figure 4A:
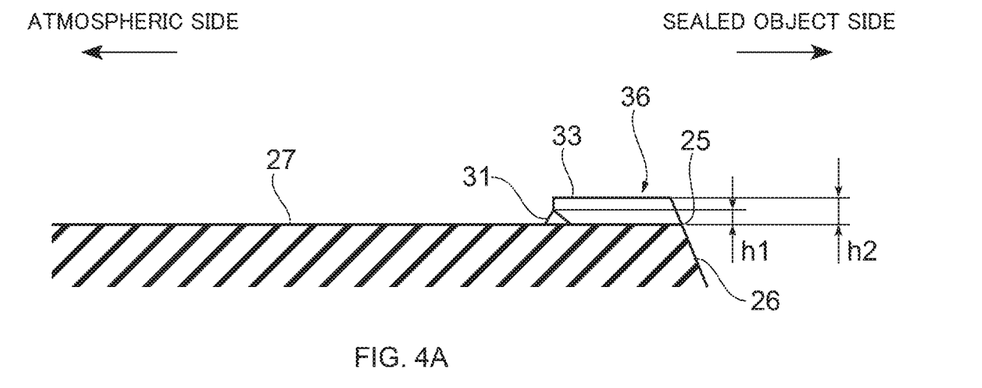
FIG. 4A is an enlarged diagram of a short screw projection illustrating the parallel screw projection in the short screw projection in a direction orthogonal to an extending direction along the atmospheric side surface.
Figure 4B:
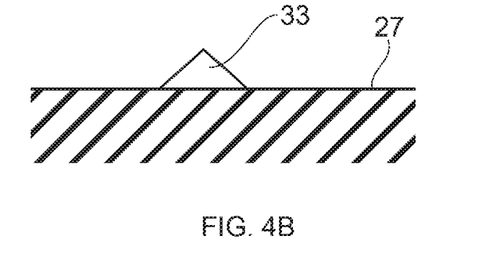
FIG. 4B is a sectional diagram of a cross section orthogonal to the extending direction of the parallel screw projection.

As described above (see FIG. 2), only the parallel screw projections 33 forming the short screw projection 36 are provided between the mutually adjacent long screw projections 35. FIGS. 4A and 4B are diagrams for illustrating the shape of a parallel screw projection 33. FIG. 4A is an enlarged diagram of a parallel screw projection 33 illustrating a parallel screw projection 33 in the short screw projection 36 seen in a direction orthogonal to the extending direction along the atmospheric side surface 27. FIG. 4B is a sectional diagram of a cross section orthogonal to the extending direction of the parallel screw projection 33. As illustrated in FIGS. 4A and 4B, only the parallel screw projection 33 extends between the lip tip 25 and the circumferential projection 31 between the mutually adjacent long screw projections 35.

As illustrated in FIGS. 3A and 4A, the circumferential projection 31 extends on the atmospheric side surface 27 in a manner that the circumferential projection 31 connects to the parallel screw projections 33 at end portions thereof on the atmospheric side. Thus, in the long screw projection 35 formed by connecting the bilge screw projection 34 and the parallel screw projection 33, the circumferential projection 31 extends in a manner that the circumferential projection 31 passes through the position of the connection portion 37 at which the parallel screw projection 33 is connected to the bilge screw projection 34.

As illustrated in FIGS. 3A and 4A, the height h1 of the circumferential projection 31 from the atmospheric side surface 27 is less than the height h2 of the parallel screw projection 33 so that an airflow generated by the bilge screw projection 34 during rotation of the rotating shaft and flowing from the atmospheric side (outer side) toward the sealed object side (inner side) is not blocked by the circumferential projection 31.

As described above, further on the atmospheric side from the circumferential projection 31 in the screw portion 32 of the lip tip portion 24, the bilge screw projections 34 arranged at equal pitch intervals such as the pitch w2 extend from the circumferential projection 31. Each of the bilge screw projections 34 does not overlap the adjacent bilge screw projection 34 in the sliding direction (direction of arrow R in FIG. 2) of the rotating shaft in the direction of the axis x with each other. Meanwhile, in the screw portion 32 of the lip tip portion 24, the parallel screw projections 33 arranged at equal pitch intervals such as the pitch w1 less than the pitch w2 extend between the lip tip 25 and the circumferential projection 31.

As described above, further on the atmospheric side from the circumferential projection 31 in the screw portion 32 of the lip tip portion 24, each of the bilge screw projections 34 has a distance d in the extending direction of the lip tip 25 between the end portion 34a of the bilge screw projections 34 on the sealed object side and the end portion 34b on the atmospheric side of the adjacent bilge screw projection 34. A passage (passage A) with a distance d extending in the direction of the axis x is formed between the mutually adjacent bilge screw projections 34 (see FIG. 2). Thus, foreign matter entering the space surrounded by the circumferential projection 31 and the mutually adjacent bilge screw projections 34 can be pushed back to the atmospheric side through the passage A, thereby suppressing foreign matter from depositing in the space surrounded by the circumferential projection 31 and the mutually adjacent bilge screw projections 34. Thus, this configuration can suppress the lip tip portion 24 from floating up from the rotating shaft when foreign matter deposits between the screw portion 32 and the rotating shaft, the deposited foreign matter interferes with the rotating shaft. Further, this configuration can suppress foreign matter from approaching to the lip tip 25.

Meanwhile, further on the sealed object side from the circumferential projection 31, which is closer to the lip tip 25, in the screw portion 32 of the lip tip portion 24, the less the pitch w1 of the parallel screw projections 33, the greater the pumping action of the parallel screw projections 33, and thus, the larger the airflow flowing from the atmospheric side toward the sealed object side. Thus, the pumping action near the lip tip 25 is configured to exert sufficient force to push back the sealed object leaked from the sealed object side beyond the lip tip 25 toward the sealed object side.

As described above, according to the sealing apparatus 1 of the embodiment of the present disclosure, it is possible to suppress foreign matter from depositing between the screw projections further on the non-sealed object side (atmospheric side) than the circumferential projection 31. More specifically, according to the sealing apparatus 1 of the embodiment of the present disclosure, in the screw portion 32 of the lip tip portion 24 of the elastic body part 20, further on the sealed object side than the circumferential projection 31, the parallel screw projections 33 can exert sufficient force (pumping force) to push back the sealed object leaked from the sealed object side toward the sealed object side, and it is possible to suppress foreign matter from depositing at further on the atmospheric side than the circumferential projection 31.

Figure 5:
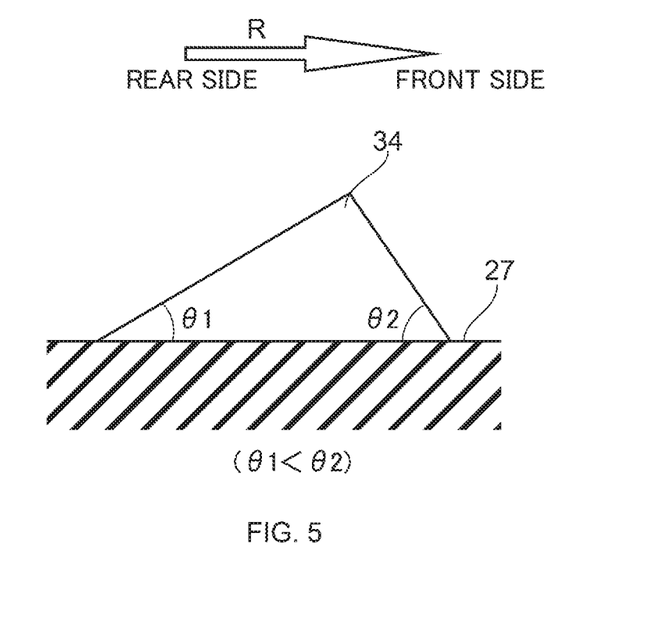
FIG. 5 is a sectional diagram illustrating another example of a cross sectional shape of a cross section orthogonal to the extending direction of the bilge screw projection in the sealing apparatus illustrated in FIG. 1.

In addition, the cross-sectional shape of the cross section orthogonal to the extending direction of the bilge screw projection 34, when the rear side surface in the sliding direction R of the rotating shaft has an lower inclination with respect to the atmospheric side surface 27 than the front side surface in the sliding direction R of the rotating shaft ($\theta 1<\theta 2$) as illustrated in FIG. 5, can facilitate the movement of foreign matter from the space surrounded by the adjacent bilge screw projections 34 and the circumferential projection 31 toward the atmospheric side.

In addition, an increase in height of the bilge screw projection 34 from the atmospheric side surface 27 can increase the airflow generated by the bilge screw projection 34 and flowing from the atmospheric side toward the sealed object side. This can discharge the deposited foreign matter through the passage A and can increase the pumping force of the bilge screw projection 34.

In addition, the bilge screw projection 34 has a bilge-shape such that the height thereof gradually increases from the connection point p1 to the position p2, and then gradually decreases from the position p2 toward the atmospheric side. Thus, even if the lip tip portion 24 wears and the parallel screw projections 33 wear or wear off, the bilge screw projections 34 keep contacting the rotating shaft and can exert and maintain the pumping action.

Note that the screw portion 32 may have screw projections having shapes different from the bilge screw projections 34 as the non-sealed object side screw projections. For example, the screw portion 32 may have the same screw projections as the parallel screw projections 33 as the non-sealed object side screw projections.

In the sealing apparatus 1 according to the above described embodiment of the present disclosure, the parallel screw projections 33 and the bilge screw projections 34 extend in parallel with each other (inclination angle $\alpha$=inclination angle $\beta$), and the bilge screw projections 34 are connected to every other parallel screw projections 33 in the circumferential direction, respectively, but the configuration of the parallel screw projections 33 is not limited to this and the configuration of the bilge screw projections 34 is not limited to this. The parallel screw projections 33 and the bilge screw projections 34 may not extend in parallel with each other and may be inclined (inclination angle α≠inclination angle β). In addition, the bilge screw projections 34 may be connected to every plural parallel screw projections 33 in the circumferential direction, respectively. In addition, the bilge screw projections 34 may be connected to the parallel screw projections 33, respectively, and the all parallel screw projections 33 may be connected. In addition, each of the bilge screw projections 34 may not be connected to any parallel screw projections 33. Note that as described above, the mutually adjacent bilge screw projections 34 do not overlap with each other in the direction of the axis x (distance d>0) and the bilge screw projections 34 form the passage A extending in the direction of the axis x.

In the following, a modification of the sealing apparatus 1 according to the embodiment of the present disclosure will be described. In the following description, the same reference numerals or characters are assigned to the components which are the same as or similar to those of the sealing apparatus 1 according to the above described embodiment of the present disclosure, and the description thereof is omitted. Only the different components will be described.

Figure 6:
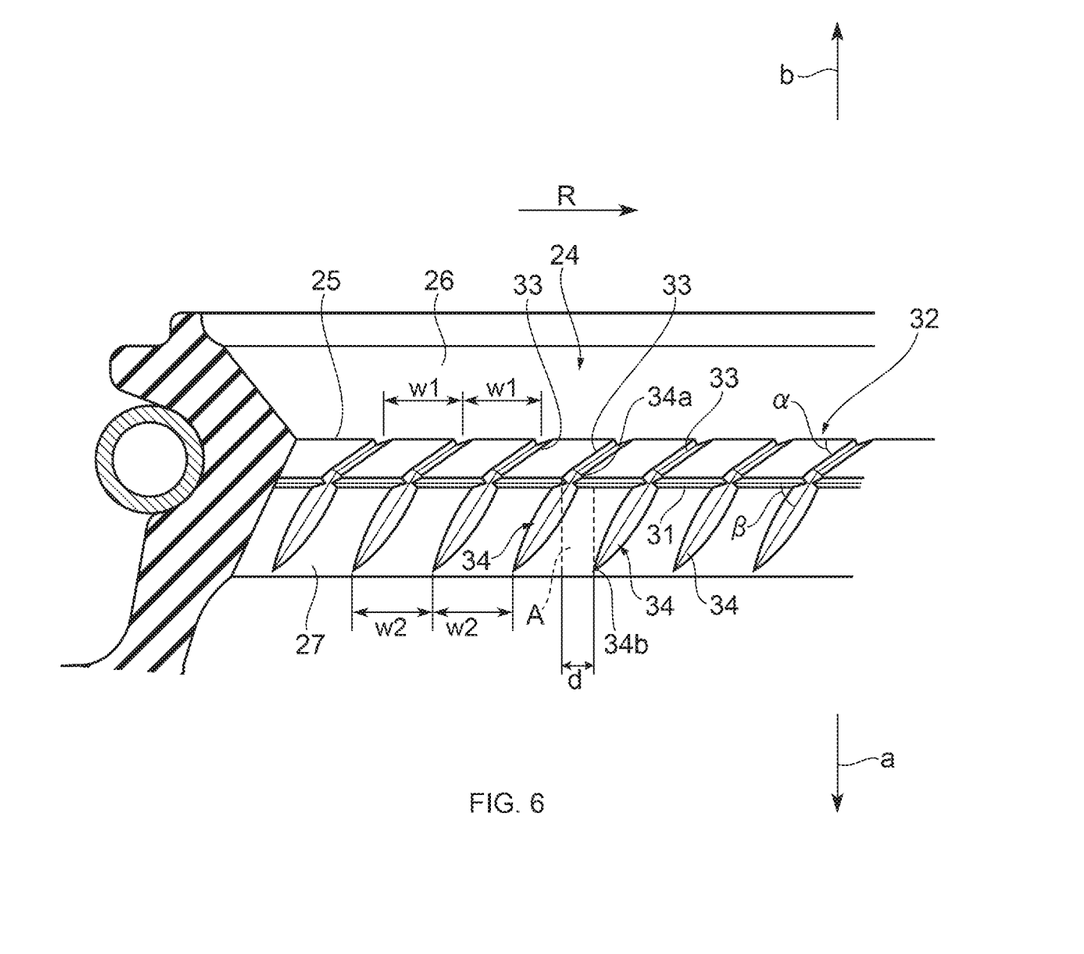
FIG. 6 is a partially enlarged diagram of the sealing apparatus illustrating an enlarged lip tip portion for illustrating a schematic configuration of a first modification of the sealing apparatus according to an embodiment of the present disclosure.

FIG. 6 is a partially enlarged diagram of the sealing apparatus illustrating an enlarged lip tip portion for illustrating a configuration of a first modification of the sealing apparatus 1 according to the embodiment of the present disclosure. The first modification is different in the configuration of the screw portion 32 of the sealing apparatus 1.

As illustrated in FIG. 6, in the first modification of the screw portion 32, the pitch w1 of the parallel screw projection 33 is the same as the pitch w2 of the bilge screw projection 34 (w1=w2), and the number of parallel screw projections 33 is the same as the number of bilge screw projections 34. In addition, each of the bilge screw projections 34 is connected to each of the parallel screw projections 33, and the short screw projections are not provided. In addition, the inclination angle α of the parallel screw projection 33 is not the same as the inclination angle β of the bilge screw projection 34. The parallel screw projections 33 and the bilge screw projections 34 do not extend in parallel with each other. The inclination angle β of the bilge screw projections 34 is greater than the inclination angle α of the parallel screw projections (β>α). The bilge screw projections 34 are inclined greater than the parallel screw projections 33 with respect to the lip tip 25. Thus, even a decrease in pitch w2 prevents the mutually adjacent bilge screw projections 34 from overlapping with each other in the direction of the axis x and a passage A with a width d extending in the axial direction is formed. The first modification can also exert the same effects as the sealing apparatus 1.

Figure 7:
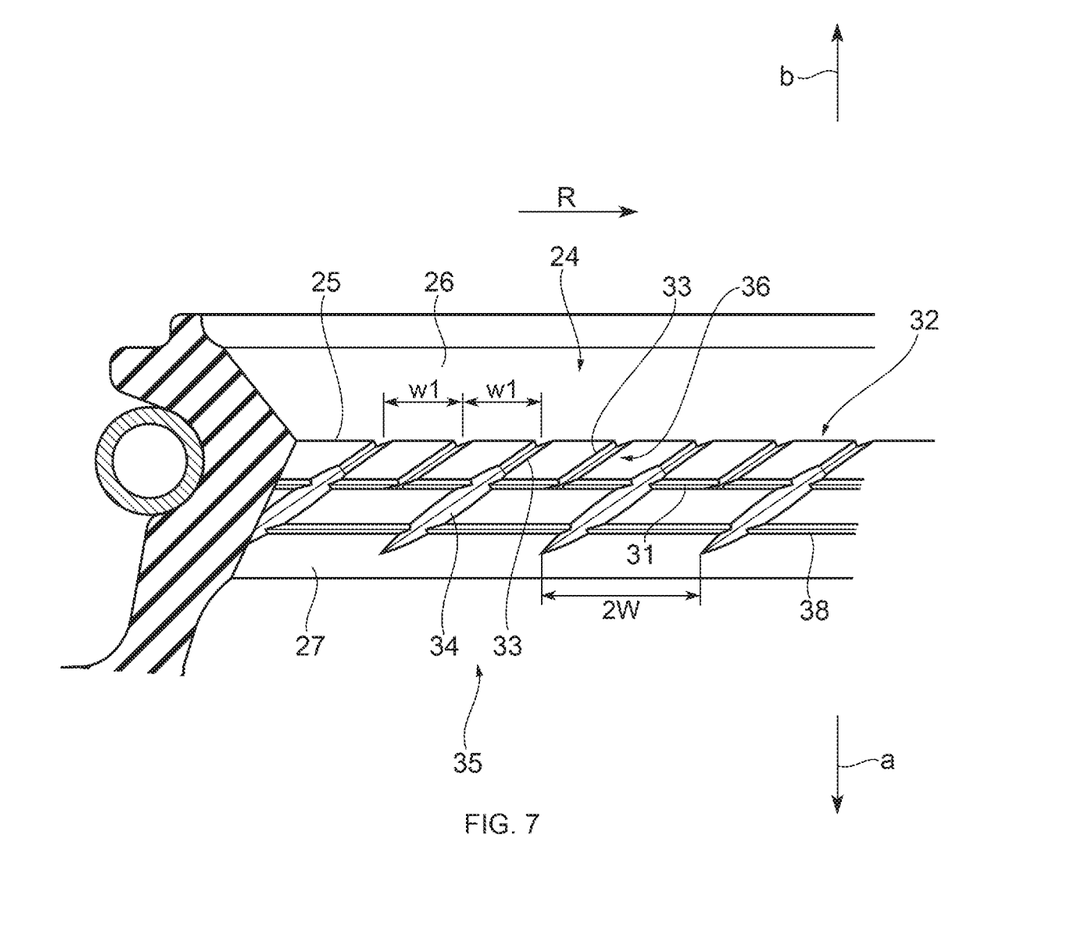
FIG. 7 is a partially enlarged diagram of the sealing apparatus illustrating an enlarged lip tip portion for illustrating a schematic configuration of a second modification of the sealing apparatus according to an embodiment of the present disclosure.

FIG. 7 is a partially enlarged diagram of the sealing apparatus illustrating an enlarged lip tip portion for illustrating a configuration of a second modification of the sealing apparatus 1 according to the embodiment of the present disclosure. The second modification is different in that a circumferential projection similar to the circumferential projection 31 is further provided on the atmospheric side surface 27 of the lip tip portion 24 of the sealing apparatus 1 according to the above described embodiment of the present disclosure.

As illustrated in FIG. 7, the second modification includes not only the circumferential projection 31 but also a circumferential projection 38 provided on the atmospheric side surface 27 of the lip tip portion 24. The circumferential projection 38 extends annularly in parallel to the circumferential projection 31 at a position closer to the atmospheric side than the circumferential projection 31. The circumferential projection 38 intersects with the bilge screw projections 34 at a position closer to the atmospheric side than the circumferential projection 31. The second modification can also exert the same effects as the sealing apparatus 1. In addition, the circumferential projection 38 serves to further prevent foreign matter from entering toward the lip tip 25. Note that like the second modification, the first modification may include the circumferential projection 38.

Hereinbefore, the embodiments of the present disclosure have been described, but the present disclosure is not limited to the sealing apparatus 1 according to the above embodiments of the present disclosure and may include all aspects included in the concept of the present disclosure and the scope of the claims. Further, the above components may be combined appropriately selectively to solve at least a part of the above problems and exert at least a part of the above effects. For example, the shape, material, arrangement, size, and the like of each component in the above embodiments can be appropriately changed according to the specific application of the present disclosure.

Specifically, the reinforcing ring 10 and the elastic body part 20 may have any shape as long as they include the lip tip portion 24 as described above. Further, the elastic body part 20 may not include the dust lip 22.

In addition, the sealing apparatus 1 according to the present embodiment is applied to an engine of an automobile, but the application of the sealing apparatus according to the present disclosure is not limited to this, but the present disclosure may be applied to any components that can utilize the effects of the present disclosure, such as a rotating shaft of other vehicle, a general-purpose machine, an industrial machine or the like.

What is claimed is:

1. A sealing apparatus comprising:
an annular reinforcing ring centered about an axis; and
an annular elastic body part comprising a seal lip, attached to the reinforcing ring, made of elastomer, and centered about the axis, wherein
the seal lip comprises a lip tip portion projecting toward an inner periphery side and defined by an annular sealing side surface on a sealed object side and an annular atmospheric side surface on a non-sealed object side, the sealing side surface and the atmospheric side surface are connected through a lip tip,
the lip tip portion comprises a circumferential projection and a screw portion capable of forming an airflow flowing toward the sealed object side, on the atmospheric side surface,
the screw portion comprises a plurality of first screw projections obliquely extending with respect to the lip tip and projecting from the atmospheric side surface; and a plurality of second screw projections obliquely extending with respect to the lip tip and projecting from the atmospheric side surface,
the circumferential projection annularly projects from the atmospheric side surface and extends parallel to the lip tip, and the circumferential projection has a height from the atmospheric side surface less than the height of each of the first screw projections and the second screw projections from the atmospheric side surface,
the first screw projections comprises a plurality of primary screw projections and a plurality of secondary screw projections, the primary screw projections extending between the lip tip and the circumferential projection, without intersecting with the circumferential projections, and are arranged at equal pitch intervals in parallel with each other, the secondary screw projections extending from the lip tip of to the circumferential projection and are arranged at equal pitch intervals in parallel with each other, the second screw projections are arranged at equal pitch intervals in parallel with each other, and each of the second screw projections does not overlap the adjacent second screw projections in a direction of the axis with each other, and each of the second screw projections is connected to an end portion of a respective primary screw projection and extends therefrom to the non-sealed object side such that each of the second screw projections intersects with the circumferential projection.

2. The sealing apparatus according to claim 1, wherein the second screw projections have a pitch greater than the pitch of the first screw projections.

3. The sealing apparatus according to claim 1, wherein the first screw projections and the second screw projections extend in parallel with each other.

4. The sealing apparatus according to claim 1, wherein the first screw projections are parallel screw projections having a uniform shape of a cross section orthogonal to an extending direction of the first screw projections, and the second screw projections are bilge screw projections having a bilge shape in which a height from the atmospheric side surface gradually changes along an extending direction of the second screw projections.

5. The sealing apparatus according to claim 4, wherein the height of the bilge screw projections from the atmospheric side surface gradually increases toward the non-sealed object side and then gradually decreases and is equal to or greater than the height of the parallel screw projections at an end portion on the sealed object side.

* * * * *